United States Patent [19]

Baker et al.

[11] Patent Number: 4,513,331

[45] Date of Patent: Apr. 23, 1985

[54] METHOD AND APPARATUS FOR DISK DRIVE ALIGNMENT

[75] Inventors: Bradley D. Baker, San Jose; Richard L. Kelly, Santa Clara, both of Calif.

[73] Assignee: Dysan Corporation, Santa Clara, Calif.

[21] Appl. No.: 433,950

[22] Filed: Oct. 12, 1982

[51] Int. Cl.³ ............................................... G11B 5/46
[52] U.S. Cl. ........................................ 360/75; 360/135
[58] Field of Search .................... 360/75, 76, 77, 78, 360/135

[56] References Cited

U.S. PATENT DOCUMENTS

| | | | |
|---|---|---|---|
| 4,067,044 | 1/1978 | Maeda et al. | 358/128 |
| 4,084,201 | 4/1978 | Hack et al. | 360/135 |
| 4,136,365 | 1/1979 | Chick et al. | 360/78 |
| 4,149,199 | 4/1979 | Chick et al. | 360/77 |
| 4,157,577 | 6/1979 | Porter, Jr. et al. | 360/77 |
| 4,223,347 | 9/1980 | Bouwhuis et al. | 358/128.5 |
| 4,237,502 | 12/1980 | Erickson, Jr. et al. | 360/78 |
| 4,321,636 | 3/1982 | Lenz | 360/77 |
| 4,419,701 | 12/1983 | Harrison et al. | 360/77 |
| 4,445,144 | 4/1984 | Giddings | 358/342 |
| 4,458,274 | 7/1984 | Charlson et al. | 360/75 |

*Primary Examiner*—George G. Stellar

*Attorney, Agent, or Firm*—Townsend and Townsend

[57] ABSTRACT

A method and apparatus for checking performance and alignment of a disk drive designed for use with a floppy disk having a motor driven linear positioning mechanism for locating the read/write transducer over the diskette circular tracks. A digitally prerecorded diagnostic diskette has a series of precisely located special diagnostic tracks providing reference data for various alignment and response characteristics, both mechanical and electronic. A first group of tracks have sector ID blocks followed by progressively offset data blocks interspersed therein, with the range of the offset greater than the width of the track for which the disk drive is designed, which guarantees a read failure upon reading any track. These tracks are distributed radially across the surface of the diskette at positions corresponding to each rotational phase position of the transducer stepper motor. A pair of indexed timing tracks having a fixed number of byte transitions permits testing of both the alignment of the index transducer and skew of the linear positioning device. A pair of special timing tracks affords reference data for head compliance measurement. A plurality of alternate offset tracks located centrally of the recording band provides reference data for measuring the eccentricity of the drive spindle.

10 Claims, 9 Drawing Figures

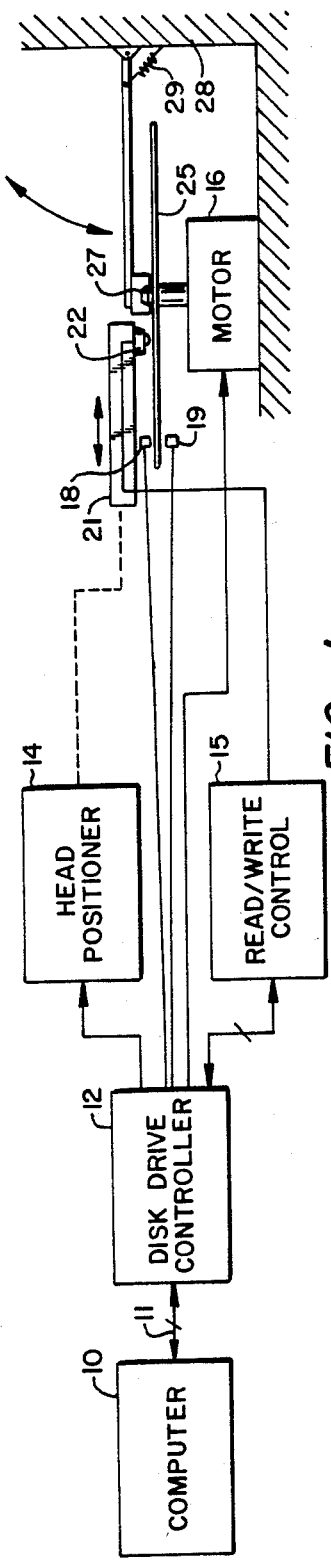
FIG._1.
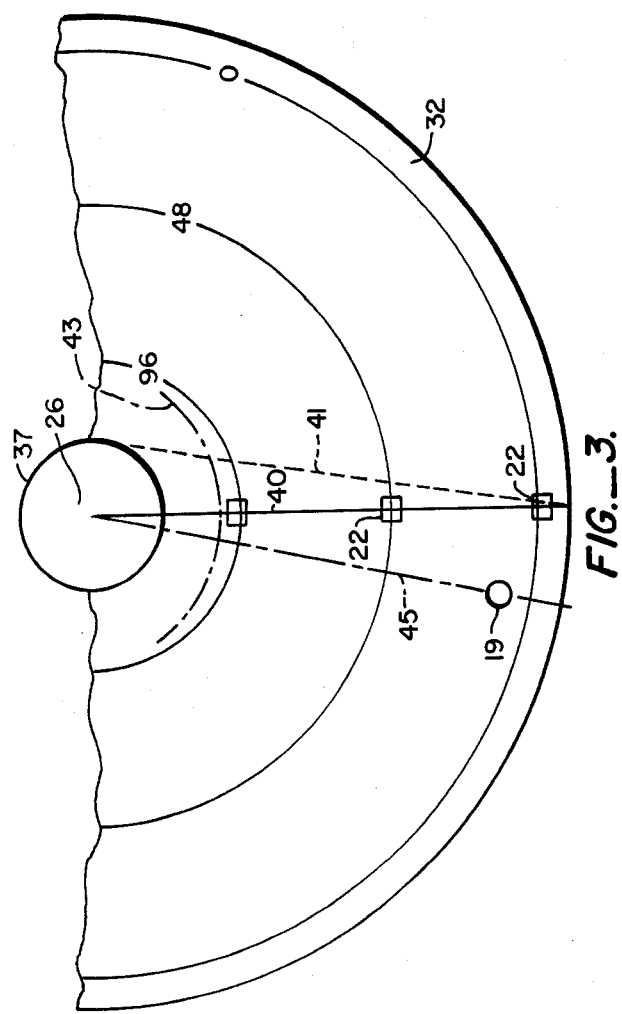
FIG._3.
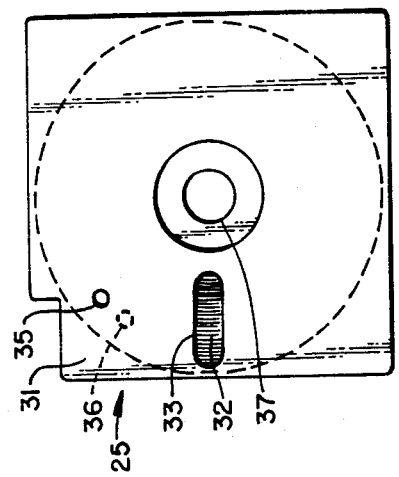
FIG._2.

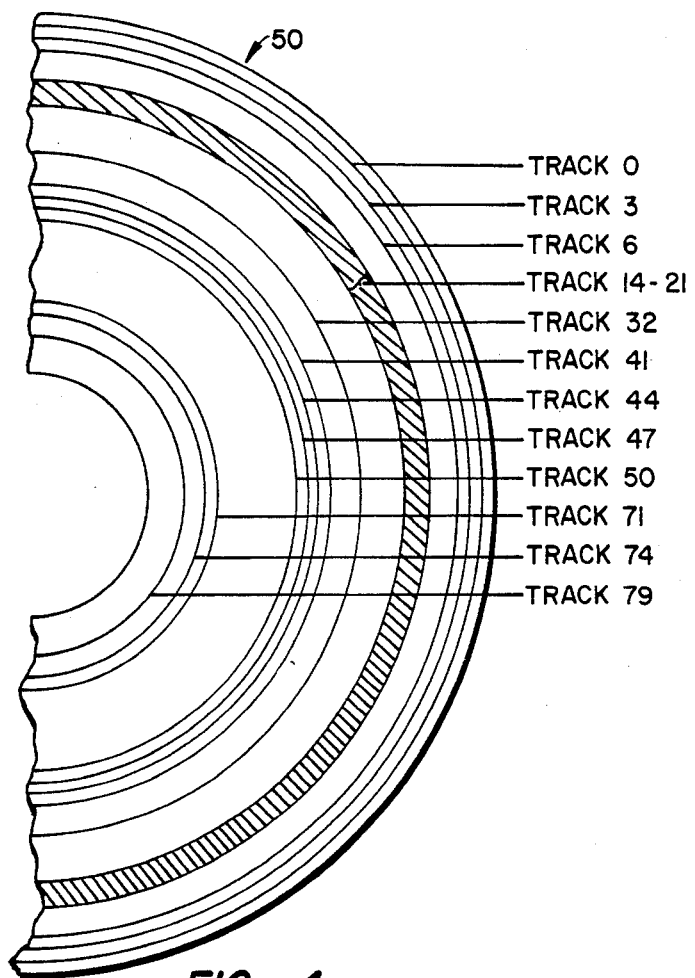
FIG._4.
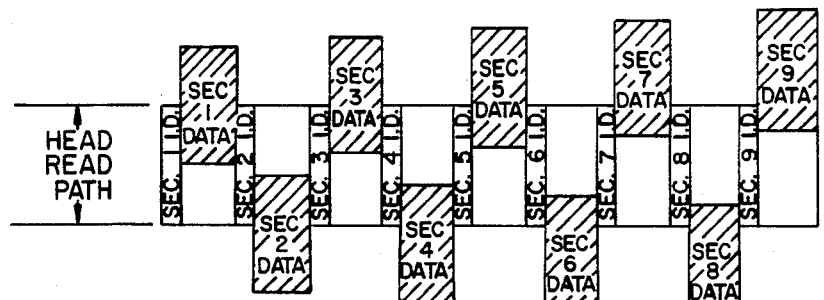
FIG._5.
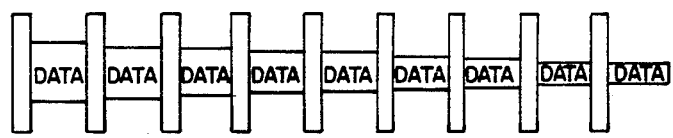
FIG._6.

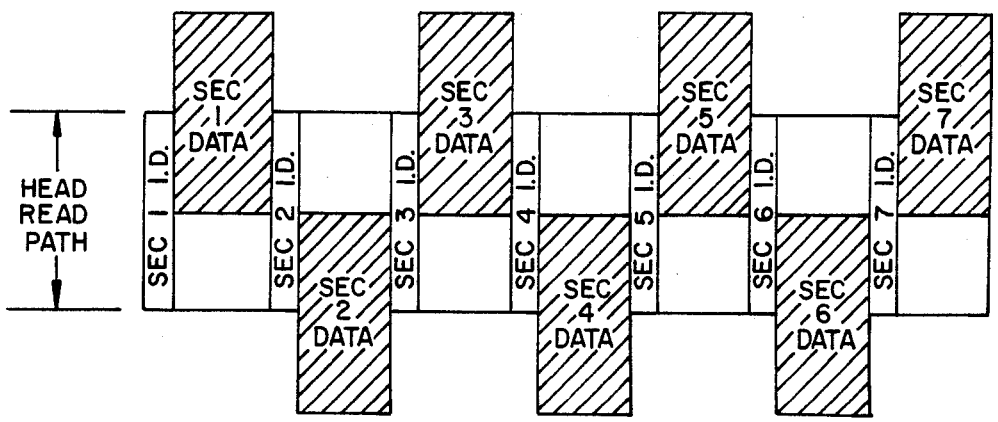
FIG._7.
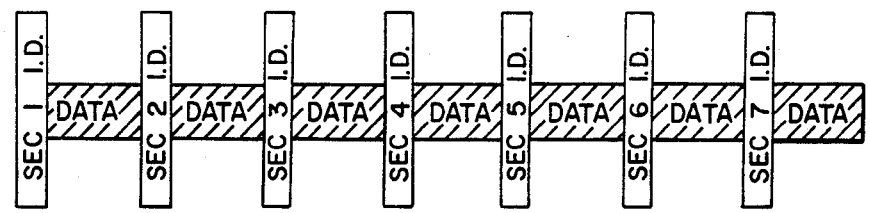
FIG._8.
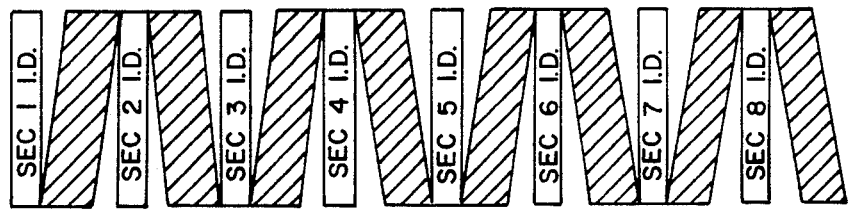
FIG._9.

METHOD AND APPARATUS FOR DISK DRIVE ALIGNMENT

BACKGROUND OF THE INVENTION

This invention relates to the field of disk drives designed for use with diskettes (floppy disks), and particularly to techniques for checking the alignment and performance of such disk drives.

Disk drives are known which are designed for use with flexible recording media popularly known as diskettes or floppy disks. Generally, such disk drives include a motor driven drive spindle and associated clamping mechanism for receiving and rotating a floppy disk at a predetermined constant speed, a transducer positioning assembly for radially positioning a read/write transducer in response to track position commands, and electronic circuitry for operating the motor, the transducer positioning mechanism and also for furnishing data to and reading data from the floppy disk. Some disk drives are designed with only one read/write transducer, while others are designed with a pair of such transducers for enabling data to be written on to and read from both sides of the floppy disk.

Data is organized on a floppy disk using a series of ideally concentric tracks, with each track being divided into a plurality of sectors formatted in a predetermined standard manner, such as an IBM 3740 format or an IBM System 34 format. The format specifies the sequence and location of certain types of information, such as track number, sector number, data field, etc. Floppy disk recording capacity is also specified as the number of tracks per inch, with forty-eight tracks per inch and ninety-six tracks per inch being popular recording densities, the former requiring a track width in the radial direction of 12 mils., the latter requiring a track width of 6 mils. The actual data is recorded onto a track using conventional magnetic recording techniques for binary data.

In order to reliably store and retrieve data on a diskette, certain mechanical parameters must be observed. For example, whenever the read/write transducer is positioned to a given track, the positioner mechanism should ideally locate the transducer symmetrically over the center line of the circular data track, with the transducer gap perpendicular to the track center line (zero Azimuth). In addition, as the transducer is moved from track to track, such movement should ideally be precisely along a radius of the diskette and not skewed at an angle to the radius (zero skew). Further, as the transducer is moved to the same track radially inwardly and radially outwardly, the final position over the track should be the same (zero hysteresis). In addition to these parameters having to do with the transducer positioning mechanism, other parameters are also critical to the proper performance of the disk drive. For example, the angular rotational position of the floppy disk must be precisely known to insure that data is stored or retrieved at a particular location in a given sector of a particular track: for this reason, each floppy disk is provided with an index hole as a zero angle reference, and the passage of this hole past an index transducer mounted in the disk drive acts as a zero reference point. Misalignment of the index transducer in the disk drive can cause erroneous data storage and retrieval. In addition, since the data is recorded in ideally concentric tracks on the floppy disk, any eccentricity of the disk drive spindle/clamp assembly will cause read and write errors.

In order to analyze the above noted disk drive alignment and performance characteristics, special alignment diskettes have been designed which contain prerecorded information in preselected track locations. Generally, three different types of prerecorded data have been used as such a diagnostic aid: alternate offset tracks, progressively offset tracks and Azimuth tracks. An alternate offset track is usually arranged as a sector identification number followed by a sector data field offset either radially inwardly or radially outwardly by a predetermined distance. The offset sector data field is followed by the next sector identification number and another sector data field offset in the opposite radial direction by the same predetermined distance. The sequence continues around the entire track. A progressively offset track is similar to an alternate offset track with the exception that the sector data fields are progressively offset from track center line by an increasing value: thus, for example, in one such implementation, the first two sector data fields are recorded directly on center, the sector three data field is recorded with a four milli-inch offset in the direction of the center of the disk, the sector four data field is recorded with a four milli-inch offset in the direction of the outer periphery of the floppy disk, the sector five data field is recorded with an offset of five milliinches towards the hub, the sector six data field is recorded with a five mili-inch offset in the peripheral direction, etc. The Azimuth track is recorded using the sector ID followed by the sector data field sequence, but with each data field being recorded at an Azimuthal angle with respect to the track center line, with alternate data fields being recorded at positive and negative angles.

In use, the alternate offset track has been employed to check the eccentricity of the disk drive spindle/clamp assembly by determining the readability of a sector, which is influenced by the reduction in amplitude due to the offset: for a perfectly concentric track, the amplitudes should be equal, while for an eccentric track the amplitudes will vary. In known alignment diskettes, a single alternate offset track has been used for checking eccentricity. The progressively offset tracks have been used to measure the radial alignment and hysteresis of the disk drive positioner mechanism: the former is checked by monitoring the electrical output signal to determine the point at which the sector data field is so far displaced from the track center line that the signals fall below the acceptable readability level. If the disk drive is aligned properly, the first two sectors for which a read failure is observed should be equally displaced on either side of track center line, while a misaligned disk drive is signified by a nonsymmetrical maximum read pattern. The latter is checked by first positioning the transducer to the progressive alignment track by approaching the track along a first direction, followed by positioning the transducer to the same track from the opposite radial direction: the difference in the two radial alignments signifies the drive hysteresis error. The Azimuth track is used to check the head Azimuth alignment in a manner similar to the use of the progressive offset tracks to check radial alignment: for a perfectly aligned drive, the read/write transducer will fail to read sectors that are equally rotated clockwise and counterclockwise, while a misaligned head will produce nonsymmetrical maximum read patterns.

In addition to the above described prerecorded alignment tracks, known alignment diskettes have been provided with timing tracks consisting of circumferential data bits precisely placed on the track relative to the photo index pulse to measure alignment of the index transducer and rotational speed.

Diagnostic diskettes of the above type have been found useful in measuring disk drive alignment and performance for a number of reasons. Firstly, the variety of tests noted above can be performed in a relatively short period of time, on the order of five minutes, under actual disk drive operating conditions. Since the tests are performed using software routines incorporated into the associated computer with which the disk drive under test is actually employed, no special equipment is required, and thus no special technical training is necessary (provided that the user understands the operation of his own computer). Further, since the diagnostic diskette has the same physical characteristics as an ordinary user diskette, any errors due to unusual environmental temperature and humidity conditions in the environment of the disk drive will be exhibited by errors in the alignment performance.

SUMMARY OF THE INVENTION

The invention comprises a diagnostic apparatus and method which affords all of the advantages noted above for the known diagnostic diskette while at the same time providing additional advantages enabling a more accurate analysis of the disk drive alignment and performance characteristics.

From a first aspect, the invention comprises a digital prerecorded diagnostic diskette having a plurality of alternate offset, progressive offset and timing tracks each arranged in a predetermined configuration to provide improved radial alignment, index timing, skew and eccentricity tests. The progressive offset tracks include an inner track, an outer track and at least one intermediate track in which the data sector field offset distances guarantee a read failure at the upper end of the offset range in all but the worst alignment conditions. In addition, the radial position of the plurality of progressive offset tracks is selected to ensure that, for disk drives employing a multiphase stepper motor, the radial alignment characteristic is tested for each phase of the stepper motor.

The alternate offset tracks provide an improved eccentricity alignment test by using offsets of different values for different tracks, with the magnitude of the offset being greater for inner tracks than for outer tracks. An improved index timing test is afforded by an index timing track which provides a first sector identification a fixed distance after the index hole. By computing the time period between the generation of the index pulse and the reading of the first sector identification byte, the positional accuracy of the index transducer can be exactly measured. An improved skew test is afforded by providing both an inner and an outer index timing track, and by simply performing an index timing test on the inner track and outer track, and noting differences therebetween. Also, an inner and an outer timing track each having a sector ID written at predetermined time increments in each track and beginning that same predetermined time period after the index position provides a head-media compliance test for measuring the time required for valid data to first be generated (head-load time). The speed of the rotation of the diskette is measured by noting the average time between generation of successive index pulses.

From a method standpoint, several improved alignment and performance tests are afforded by the invention. Firstly, transducer positioner linearity is checked by using the progressive offset tracks distributed across the entire radial surface of the diskette and the resulting electrical output signals are compared to determine the deviation therebetween. In addition, the positional accuracy of each of the phases of a multiphase stepper motor are specifically checked by operating the transducer positioning mechanism to position the transducer over each of the progressive offset tracks and noting the sector ID number of the first pair of read failures. By providing a relatively large value of sector data field offset in the progressive offset tracks (compared to the width of the transducer head or track width), a pair of read failures is virtually guaranteed for each track, so that the dropout values can be compared for both the hysteresis test and the radial alignment test. By using the alternate offset tracks, the existence of eccentricity of the drive spindle/clamp assembly can be determined and different degrees of eccentricity can be tested by using different ones of the alternate offset tracks each alternate offset track having a different amount of offset. The index timing of the disk drive can be accurately checked by noting the elapsed time between generation of the index pulse and reading of the first sector identification. The skew of the transducer head is measured by performing the index timing test on the inner and outer index timing tracks and comparing the two time values.

For a fuller understanding of the nature and advantages of the invention, reference should be had to the ensuing detailed description taken in conjunction with the accompanying drawings.

BRIEF DESCRIPTION OF THE DRAWINGS

FIG. 1 is a schematic diagram showing the major elements of a flexible disk drive;

FIG. 2 is a plan view of a diskette;

FIG. 3 is a schematic partial plan view illustrating the types of positional errors encountered in a disk drive;

FIG. 4 is a schematic plan view of a diagnostic diskette illustrating the several track locations;

FIG. 5 is a schematic diagram of a linearized section of a progressive offset track;

FIG. 6 is a schematic diagram of a perfect play back signal from a FIG. 5 track;

FIG. 7 is a schematic linearized diagram of an alternate offset track;

FIG. 8 is a schematic diagram of a perfect play back signal from a FIG. 7 track; and FIG. 9 is a schematic linearized diagram of an Azimuth track.

DESCRIPTION OF THE PREFERRED EMBODIMENTS

Turning now to the drawings, FIG. 1 is a schematic block diagram illustrating the major components of a computer system incorporating a disk drive for a floppy disk. As seen in this Fig., a computer 10 generates address, data and control signals which are communicated over one or more data buses 11 to a disk drive controller 12. The disk drive controller is coupled to a head positioner unit 14, a read/write control unit 15, a motor 16, and an index pulse generator consisting of a light source 18 and a photo transducer 19. As indicated by the broken lines, head positioner 14 is mechanically coupled to a carrier member 21 on which the read/write transducer 22 is mounted for linear motion radially inwardly and outwardly of a disk 25.

Disk 25 is removably mounted on a motor spindle 26 for rotation in a plane perpendicular to the page of FIG. 1, the disk 25 being held on the spindle by means of a clamp assembly 27 pivotally mounted to a fixed reference 28 and tensioned by a bias mechanism 29. Transducer 22 receives read/write control signals from control unit 15 and is capable of recording data digitally on the recording surface of disk 25 and reading data from the recording surface of disk 25. Index transducer 19 provides an index pulse per revolution of disk 25 which is used to provide an angular positional starting reference.

FIG. 2 illustrates a typical diskette 25, and as seen in this Fig. the diskette includes an outer jacket 31 containing an inner annular recording element 32 typically consisting of a pair of magnetic recording surfaces formed on a flexible polyester substrate. Jacket 31 has an elongated aperture 33 for enabling transducer 22 to gain access to the recording surface, and a small circular aperture 35 positioned for alignment with a corresponding aperture 36 formed in the recording disk 32 once per revolution to provide an unblocked light path for source 18 and index transducer 19.

FIG. 3 is a partial plan view illustrating different types of misalignment which can occur with a disk drive system of the type shown in FIG. 1 when a diskette of the type shown in FIG. 2 is inserted. As seen in this Fig., which is representative of a five inch diskette arranged for a recording density of ninety six tracks per inch, data is digitally recorded ideally along a plurality of closely packed concentric circular tracks, only three of which are illustrated by showing the center lines of the tracks (track 0, track 32 and track 79). A first type of misalignment which can occur is termed radial misalignment and three different conditions of radial alignment are illustrated: with transducer 22 positioned as shown on track 32, the transducer is perfectly centered radially with respect to the track center line; on track 0, transducer 22 is radially misaligned in the radial outward direction (negative offset); while on track 79 transducer 22 is radially misaligned in the radially inward direction (positive offset).

Dashed line 41 illustrates a condition of skew: dashed line 41 represents the linear path taken by transducer 22 when translated by a carrier member 21 whose path is skewed with respect to the radius 40 of the diskette. As illustrated by broken line 41, the transducer alignment progressively deviates from the radius 40 as the transducer 22 is moved in the radially inward direction.

Phantom segment 43 illustrates eccentricity: ideally, the geometrical center of the diskette 32 coincides with the central axis of the spindle 26, and both the spindle aperture 37 of diskette 32 and the circumference of spindle 26 are perfectly circular. In reality, this is not always the case and the circular tracks recorded on a diskette can be radially offset with respect to the axis of rotation of the spindle 26, so that the circular tracks deviate from the perfect concentric circular path as illustrated by phantom segment 43.

Phantom line 45 illustrates index timing misalignment which can occur if the index transducer 19 is misaligned with respect to the predetermined home position of the jacket aperture 35 (it being remembered that this member is fixed in position when inserted into the drive unit). The angle subtended between phantom 45 and radius 40 illustrates the index timing error.

It should be understood that the misalignment illustrated in FIG. 3 is greatly exaggerated for illustrative purposes only.

FIG. 4 is a partial schematic plan view of a diagnostic diskette fabricated according to the teachings of the invention. As seen in this Fig., the diskette 50 is provided with a number of prerecorded tracks which are precisely positioned on the surface of the diskette and which contain special alignment information to be used for the several tests described below. In this embodiment of the invention, the numbered tracks shown in FIG. 4 follow the following format:

|  | Side "0" and Side "1" |
| --- | --- |
| Track 0 | Index Format and Progressive Offset Track Timing Track |
| Track 6 | Progressive Offset |
| Tracks 14 thru 21 | User Area |
| Track 32 | Progressive Offset |
| Track 41 | Progressive Offset |
| Track 44 | Alternate Offset (1) |
| Track 47 | Alternate Offset (2) |
| Track 50 | Alternate Offset (3) |
| Track 71 | Progressive Offset |
| Track 74 | Timing Track |
| Track 79 | Index Format and Progressive Offset |

The above format is specifically provided for a five inch diskette having a 96 tracks per inch recording density. The individual track formats are as follows:

INDEX FORMAT:

Special Format used to obtain an index timing reference:
Single density—10 bytes (field filled with FF)
Double density—20 bytes (field filled with 4E).

PROGRESSIVE OFFSET:

Tracks are written with track and sector ID fields on track centerline. Data fields are radially displaced from the track centerline as shown below. Positive value indicates an offset toward the spindle, negative value indicates away from the spindle.

| Sector Number | Offset in Millinches |
| --- | --- |
| 1 | +3.0 |
| 2 | −3.0 |
| 3 | +3.5 |
| 4 | −3.5 |
| 5 | +4.0 |
| 6 | −4.0 |
| 7 | +4.5 |
| 8 | −4.5 |
| 9 | +5.0 |
| 10 | −5.0 |
| 11 | +5.5 |
| 12 | −5.5 |
| 13 | +6.0 |
| 14 | −6.0 |
| 15 | +6.5 |
| 16 | −6.5 |

TIMING TRACK:

First sector ID header (#1) occurs at 1 ms after photo index and at 1 ms increments thereafter.

USER AREA:

This is a memory space alloted for user programs.

ALTERNATE OFFSET (1):

All odd sectors are written offset +3.0 millinches.

All even sectors are written offset −3.0 millinches.
ALTERNATE OFFSET (2):
All odd sectors are written offset +3.5 millinches.
All even sectors are written offset −3.5 millinches.
ALTERNATE OFFSET (3):
All odd sectors are written offset +4.0 millinches.
All even sectors are written offset −4.0 millinches.

Sectors 1 and 2 of all recorded tracks except the timing tracks are recorded with the diskette revision, serial number, part number, format type, tracks per inch, bytes per sector and side identifier. Also, there is a block identifying track locations and functions along with the range and increment of each track. This information appears as follows:

```
(DY506-100 XA) 000XXX FM 96 128 1 [PO-0,6,32,41,71,79/1,16/3.0/0.5
             |      |  |  |   | |  |       |       |    |   |
             |      |  |  |   | |  |       |       |    |   Increment (millinches)
             |      |  |  |   | |  |       |       |    Starting Offset (millinches)
             |      |  |  |   | |  |       |       Last Sector
             |      |  |  |   | |  |       First Sector
             |      |  |  |   | |  Track Locations
             |      |  |  |   | Track Function (Progressive Offset)
             |      |  |  |   Starts Parameter Block
             |      |  |  Number of Sides (1 or 2)
             |      |  Bytes per Sector
             |      Tracks per Inch
             |    Format Encoding
             |  Diskette Serial Number
             Diskette Revision
          Diskette Model Number IF-0,79 TT-3,74/1.0 AO-44,47,50/1,16/3.0/0.5]
              |   |   |   |   |   |   |        |   |  |  |
              |   |   |   |   |   |   |        |   |  |  Ends Parameter Block
              |   |   |   |   |   |   |        |   |  Increment (Millinches)
              |   |   |   |   |   |   |        |   Starting Offset (millinches)
              |   |   |   |   |   |   |        Last Sector
              |   |   |   |   |   |   First Sector
              |   |   |   |   |   Track Locations
              |   |   |   |   Track Function (Alternate Offset)
              |   |   |   Increment (milliseconds)
              |   |   Track Locations
              |   Track Function (Timing Track)
              Track Locations
           Track Function (Index format)
```

FIG. 5 illustrates in schematic form a linearized version of the first nine sectors of a progressive offset track, such as track 0, track 6, etc. As seen in this Fig., each sector ID is followed by a fixed block of sector data, with each sector data block being progressively offset in alternating positive and negative directions. With reference to the offset values given above, and remembering that this embodiment is designed for use with a disk drive system using a six mil wide head, the sector data block for sector number 13 will be completely outside the range of a perfectly aligned read/write transducer. The effect on the output signal of the progressive misalignment is illustrated in FIG. 6 for the first nine sectors and following data blocks for a perfectly aligned transducer. As will be apparant to those skilled in the art, read failures should occur prior to reaching the sixteenth sector data block.

FIG. 7 is a schematic diagram illustrating a highly linearized version of an alternate offset track, such as track 44. As seen in this Fig., each sector ID is followed by a block of data offset by a predetermined value from the track center line. FIG. 8 illustrates the play back signal received from a perfectly aligned transducer from an alternate offset track such as that shown in FIG. 7.

Another example of a digitally prerecorded diagnostic diskette suitable for use in a five inch diskette with a track density of one hundred tracks per inch is as follows:

|  | Side "0" and Side "1" |
| --- | --- |
| Track 0 | Index Format and Progressive Offset |
| Track 3 | Timing Track |
| Track 6 | Progressive Offset |
| Track 14 thru 21 | User Area |
| Track 36 | Progressive Offset |
| Track 41 | Progressive Offset |
| Track 44 | Alternate Offset (1) |
| Track 47 | Alternate Offset (2) |
| Track 50 | Alternate Offset (3) |
| Track 68 | Timing Track |
| Track 71 | Progressive Offset |
| Track 76 | Index Format and Progressive Offset |

INDEX FORMAT:
Special Format used to obtain an index timing reference:
Single density—10 bytes (field filled with FF)
Double density—20 bytes (field filled with 4E).

PROGRESSIVE OFFSET:
Tracks are written with track and sector ID fields on track centerline. Data fields are radially displaced from the track centerline as shown below. Positive value indicates an offset toward the spindle, negative value indicates away from the spindle.

| Sector Number | Offset in Millinches |
| --- | --- |
| 1 | +3.0 |
| 2 | −3.0 |
| 3 | +3.5 |
| 4 | −3.5 |
| 5 | +4.0 |
| 6 | −4.0 |
| 7 | +4.5 |
| 8 | −4.5 |
| 9 | +5.0 |
| 10 | −5.0 |
| 11 | +5.5 |

-continued

| Sector Number | Offset in Millinches |
| --- | --- |
| 12 | −5.5 |
| 13 | +6.0 |
| 14 | −6.0 |
| 15 | +6.5 |
| 16 | −6.5 |

TIMING TRACK:

First sector ID header (#1) occurs at 1 ms after photo index and at 1 ms increments thereafter.

USER AREA:

This is a memory space alloted for user programs.

ALTERNATE OFFSET (1):

All odd sectors are written offset +3.0 millinches.
All even sectors are written offset −3.0 millinches.

ALTERNATE OFFSET (2):

All odd sectors are written offset +3.5 millinches.
All even sectors are written offset −3.5 millinches.

ALTERNATE OFFSET (3):

All odd sectors are written offset +4.0 millinches.
All even sectors are written offset −4.0 millinches.

A comparison of the two above formats illustrates the similarities and differences between a five inch diskette with ninety six tracks per inch and a five inch diskette with one hundred tracks per inch. The value of the progressive offsets and the three alternate offsets are identical, and both diskettes have the same number of prerecorded tracks. However, the central and inner track numbers are different and the innermost progressive offset and timing tracks are reversed in order (i.e. in the case of the ninety six tracks per inch diskette the innermost progressive offset track is recorded outwardly of the inner most timing track, while in the one hundred tracks per inch version that order is reversed).

The following are two examples of digitally prerecorded diagnostic diskettes for forty eight tracks per inch recording density, the first for a five inch diskette and the second for an eight inch diskette.

|  | Side "0" and Side "1" |
| --- | --- |
| Track 0 | Index Format and Progressive Offset |
| Track 3 | Timing Track |
| Track 5 | Progressive Offset |
| Tracks 7 thru 14 | User Area |
| Track 16 | Progressive Offset |
| Track 19 | Progressive Offset |
| Track 21 | Alternate Offset (1) |
| Track 24 | Alternate Offset (2) |
| Track 27 | Alternate Offset (3) |
| Track 30 | Progressive Offset |
| Track 36 | Timing Track |
| Track 34 | Index Format and Azimuth Rotation |
| Track 39 | Progressive Offset |

INDEX FORMAT:

Special Format used to obtain an index timing reference;

Single density—10 bytes (field filled with FF)
Double density—20 bytes (field filled with 4E).

PROGRESSIVE OFFSET:

Tracks are written with track and sector ID fields on track centerline. Data fields are radially displaced from the track centerline as shown below. Positive value indicates an offset toward the spindle, negative value indicates away from the spindle.

| Number | Offset in Millinches |
| --- | --- |
| 1 | +6 |
| 2 | −6 |
| 3 | +7 |
| 4 | −7 |
| 5 | +8 |
| 6 | −8 |
| 7 | +9 |
| 8 | −9 |
| 9 | +10 |
| 10 | −10 |
| *11 | +11 |
| *12 | −11 |
| *13 | +12 |
| *14 | −12 |
| *15 | +13 |
| *16 | −13 |

TIMING TRACK:

First sector ID header (#1) occurs at 1 ms after photo index and at 1 ms increments thereafter.

USER AREA:

This is a memory space alloted for user programs.

ALTERNATE OFFSET (1):

All odd sectors are written offset +7 millinches.
All even sectors are written offset −7 millinches.

ALTERNATE OFFSET (2):

All odd sectors are written offset +8 millinches.
All even sectors are written offset −8 millinches.

ALTERNATE OFFSET (3):

All odd sectors are written offset +9 millinches.
All even sectors are written offset −9 millinches.

AZIMUTH OFFSET:

This track is written on track centerline. Track and sector ID fields are written at zero azimuth. Data fields are written with the head azimuth angle shown below.

| Sector Number | Azimuth in Minutes |
| --- | --- |
| 1 | +21 |
| 2 | −21 |
| 3 | +24 |
| 4 | −24 |
| 5 | +27 |
| 6 | −27 |
| 7 | +30 |
| 8 | −30 |
| 9 | +33 |
| 10 | −33 |
| 11 | +36 |
| 12 | −36 |
| 13 | +39 |
| 14 | −39 |
| 15 | +42 |
| 16 | −42 |

Sectors 1 and 2 of all recorded tracks except the timing tracks are recorded with the diskette revision, serial number, part number, format type, tracks per inch, bytes per sector and side identifier. Also, there is a block identifying track locations and functions along with the range and increment of each track. This information appears as follows:

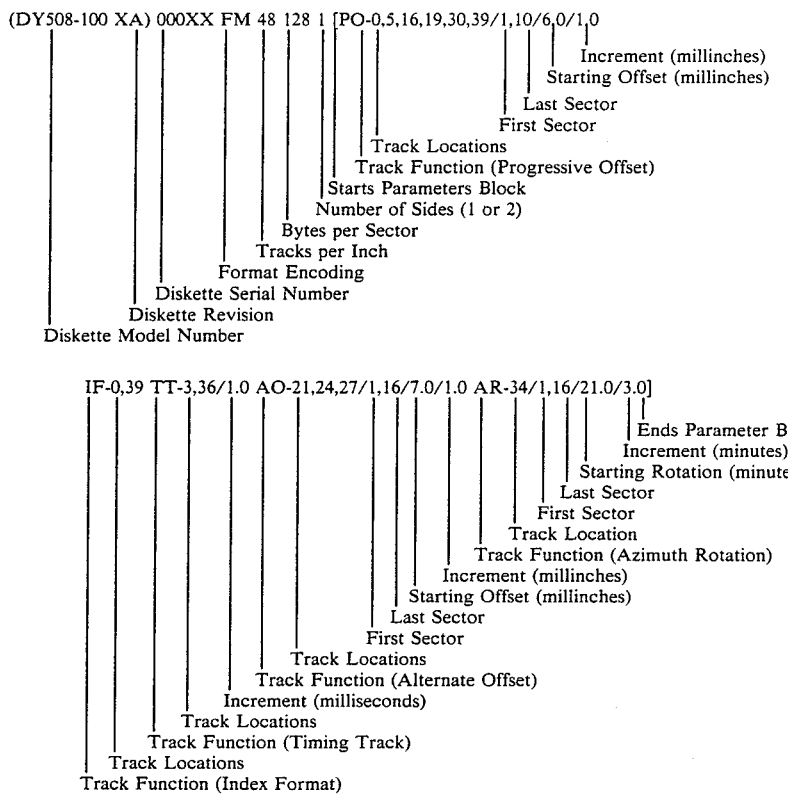

| | Side "0" and Side "1" |
|---|---|
| Track 0 | Index Format and Progressive Offset |
| Track 3 | Progressive Offset |
| Track 5 | Timing Track |
| Tracks 10 thru 19 | User Area |
| Track 35 | Alternate Offset (1) |
| Track 38 | Progressive Offset |
| Track 41 | Progressive Offset |
| Track 44 | Alternate Offset (2) |
| Track 47 | Alternate Offset (3) |
| Track 68 | Timing Track |
| Track 70 | Progressive Offset |
| Track 73 | Progressive Offset |
| Track 76 | Index Format and Azimuth Rotation |

INDEX FORMAT:

Special Format used to obtain an index timing reference:
Single density—10 bytes (field filled with FF)
Double density—20 bytes (field filled with 4E).

PROGRESSIVE OFFSET:

Tracks are written with track and sector ID fields on track centerline. Data fields are radially displaced from the track centerline as shown below. Positive value indicates an offset toward the spindle, negative value indicates away from the spindle.

| Sector Number | Offset in Millinches |
|---|---|
| 1 | +1 |
| 2 | −1 |
| 3 | +2 |
| 4 | −2 |
| 5 | +3 |
| 6 | −3 |

-continued

| Sector Number | Offset in Millinches |
|---|---|
| 7 | +4 |
| 8 | −4 |
| 9 | +5 |
| 10 | −5 |
| 11 | +6 |
| 12 | −6 |
| 13 | +7 |
| 14 | −7 |
| 15 | +8 |
| 16 | −8 |
| 17 | +9 |
| 18 | −9 |
| 19 | +10 |
| *20 | −10 |
| *21 | +11 |
| *22 | −11 |
| *23 | +12 |
| *24 | +13 |
| *25 | −13 |

TIMING TRACK:

First sector ID header (#1) occurs at 1 ms after photo index and at 1 ms increments thereafter.

USER AREA:

This is a memory space alloted for user programs.

ALTERNATE OFFSET (1):

All odd sectors are written offset +7 millinches.
All even sectors are written offset −7 millinches.

ALTERNATE OFFSET (2):

All odd sectors are written offset +8 millinches.
All even sectors are written offset −8 millinches.

ALTERNATE OFFSET (3):

All odd sectors are written offset +9 millinches.
All even sectors are written offset −9 millinches.

AZIMUTH OFFSET:

This track is written on track centerline. Track and sector ID fields are written at zero azimuth. Data fields are written with the head azimuth angle shown below.

| Sector Number | Azimuth in Minutes |
| --- | --- |
| 1 | +18' |
| 2 | −18' |
| 3 | +20' |
| 4 | −20' |
| 5 | +22' |
| 6 | −22' |
| 7 | +24' |
| 8 | −24' |
| 9 | +26' |
| 10 | −26' |
| 11 | +28' |
| 12 | −28' |
| 13 | +30' |
| 14 | −30' |
| 15 | +32' |
| 16 | −32' |
| 17 | +34' |
| 18 | −34' |
| 19 | +36' |
| 20 | −36' |
| 21 | +38' |
| 22 | −38' |
| 23 | +40' |
| 24 | −40' |
| 25 | +42' |
| 26 | −42' |

A comparison of the formats for the forty eight tracks per inch, five inch diskette and the ninety six tracks per inch five inch diskette shows the same general progression of the prerecorded track types from the outermost to the innermost track, with the addition of an extra progressive offset track on track thirty nine, and the inclusion of an Azimuth rotation track in combination with the inner index format track (track 34). FIG. 9 shows the first eight sectors of an Azimuth rotation track, which is seen to include a series of sector ID blocks interspersed with data blocks, with successive pairs of data blocks being recorded at the same Azimuthal angle with respect to the track center line, and with the Azimuthal angle of each pair increasing along the track. This track is used to determine the Azimuthal read margins of the recording gap of the transducer 22 with respect to the track center line. If the head is perfectly aligned asamuthally, the first pair of read failures should occur at the same angle in the positive and negative directions.

A comparison of the two forty eight track per inch prerecorded diskettes shows the similarities and differences therebetween. The two formats use the same number of prerecorded tracks, and the same number of progressive offset tracks, index format tracks, timing tracks, alternate offset tracks and a single Azimuth rotation track combined with an index format track. With the exception of the first three tracks, the track numbers are different and the sequence of tracks varies in the manner indicated.

The specific track location and sequence of the different types of prerecorded digital tracks are selected on the basis of a number of criteria. Firstly, since radial alignment should be checked entirely across the recording surface of the disk, progressive offset tracks should be provided at least near the innermost track, the outermost track and a center track. Further, to ensure that each phase of a stepper motor shaft position will be tested for both three phase and four phase stepper motors, six progressive offset tracks are employed, with the specific locations selected to accomplish this purpose. Each diskette should be provided with a separate timing track near the outermost track and the innermost track in order to test head-media compliance at both extreme transducer position. Similarly, the index timing tracks are provided adjacent the innermost and outermost track locations in order to provide a skew measurement reference. The amount of the progressive offset is selected to match the head width for which the disk drive is designed so that a read failure is guaranteed at some point along each progressive offset track. For example, for the forty eight track per inch versions, which are designed for use with 12 mil heads, the progressive offset begins at 6 mils and extends to 13 mils, representing a transducer completely off track. The alternate offset track values are selected to providing three different levels of criteria for judging the eccentricity of the drive.

The diagnostic diskettes are used in conjunction with a diagnostic program loaded into computer 10 to perform the various alignment and performance tests of the disk drive.

The alternate offset tracks are used to measure the eccentricity of the drive. For a properly aligned drive all sectors around a given track should be read equally, and this should be true for all three offset tracks. This test ensures that the drive spindle is spinning properly and further that the disk is centered on the spindle.

The index timing tracks each incorporate sector identification information precisely written so as to be spaced at a multiple of an exact time period from the leading edge of the index pulse. For a double density MFM recorded eight inch disk, this time period is approximately 320 microseconds; while for a single density FM recorded eight inch disk the time period is 640 microseconds. Thus, beginning with the leading edge of the index pulse, a timer in the computer is started and stopped after the first sector ID has been read. The time value achieved by the counter provides an indication of the alignment of the index transducer 19.

The index timing tracks are also used to measure positioner skew by performing the index timing test on the outer most track and the inner most track and comparing the two values obtained.

Head positioner linearity is measured using the progressive offset tracks: each progressive offset track is read and the read failures are used to indicate the linearity.

Head load time is measured by means of the two timing tracks provided on each diskette. Beginning with the generation of a read command, the number of ID blocks written at approximately one millisecond increments on a timing track are scanned until a valid read is obtained from the timing track. The ID number of the first valid read directly indicates the time required by the drive to achieve proper head loading. If desired, a timer may be used to provide a digital indication of the head load time.

If desired, either timing track may be used to measure the spindle speed.

Azimuthal margin rotation is measured (in the case of forty eight tracks per inch disk drives) using the Azimuthal rotation track provided on each diskette. As noted above, a read failure should be obtained for a pair of data blocks recorded at the positive and negative values of the same Azimuthal angle.

The invention affords a degree of flexibility and a testing accuracy absent from the known diagnostic diskettes described supra. For example, by providing progressive offsets sufficiently great to guarantee read failures when performing a radial alignment test, the user is assured that even a disk drive with superior performance characteristics and perfect alignment can have its maximum margins determined. Further, the progressive offset tracks serve the additional purpose of testing the hysteresis performance of the transducer positioning mechanism. In addition, by careful selection of the number and location of the progressive offset tracks, the alignment of all phases of multiphase stepping motors can be checked regardless of whether the motor is a three phase or a four phase motor. This enables the user to establish that radial misalignment is due to rotational inaccuracy in the stepper motor itself, rather than somewhere in the electromechanical section of the linear positioner. The timing track has been found to provide a highly accurate measurement of the head-load time; and the use of an inner and outer pair of identical index timing tracks provides a measurement of the index transducer alignment and also enables a different alignment measurement to be obtained by simply repeating the same test twice using the different tracks. Lastly, by providing a separate set of eccentricity tracks, (i.e. the three alternate offset tracks), different degrees of spindle eccentricity can be determined in a relatively simple manner.

While the above provides a full and complete disclosure of the invention, various modifications, alternate constructions and equivalents may be employed without departing from the spirit and scope of the invention. For example, for disk drives designed for use with floppy disks of other sizes and different track densities, the exact arrangement of the several diagnostic tracks will vary in accordance with the criteria stated above. Therefore, the above should not be construed as limiting the invention, which is defined by the appended claims.

What is claimed is:

1. An improved digital diagnostic diskette for use in testing alignment and performance of a disk drive having a linear position mechanism for a transducer, said diskette comprising a magnetic recording disk having a first plurality of progressive offset concentric data tracks distributed there across at different predetermined radial positions, each progressive offset track having an offset range exceeding the track width for which said transducer is designed.

2. The combination of claim 1 wherein said linear positioning mechanism is driven by a multiphase drive motor, and wherein the radial positions of said progressive offset data tracks correspond to all of the rotational phases of said drive motor.

3. The combination of claim 1 wherein said diskette further includes a second plurality of alternate offset concentric data tracks located centrally of said disk.

4. The combination of claim 1 wherein said diskette further includes a pair of index timing tracks located adjacent the inner most and outer most track on said disk, respectively.

5. The combination of claim 4 wherein at least one of said progressive offset tracks is incorporated in one of said index timing tracks.

6. The combination of claim 1 wherein said diskette further includes a pair of timing tracks located adjacent the inner most and outer most track on said disk, respectively, each said timing track having a series of fiducial marks spaced therealong at a predetermined interval corresponding to a fixed time period when said disk is rotated at a predetermined speed.

7. A method of checking the alignment and performance of a disk drive having a motor driven disk spindle and a linear positioning mechanism for a transducer and designed for use with a flexible diskette, said method comprising the steps of:
   (a) inserting a diagnostic diskette onto said spindle, said diskette having a first plurality of progressive offset concentric data tracks distributed there across at different predetermined radial positions, each progressive offset track having an offset range exceeding the track width for which said transducer is designed;
   (b) rotating said diagnostic diskette with said spindle;
   (c) positioning said transducer to a first location over one of said progressive offset concentric data tracks;
   (d) reading the progressive offset track; and
   (e) determining the relative position along the progressive offset track at which a read failure occurs.

8. The method of claim 7 wherein said step (c) of positioning said transducer is performed in a first radial direction, and further including the steps of:
   (f) positioning said transducer to the same progressive offset track from the opposite radial direction and repeating steps (d) and (e); and
   (g) comparing the relative position at which the read failure occurs in opposite radial directions.

9. The method of claim 7 wherein the radial positions of said progressive offset data tracks correspond to all of the rotational phases of the disk drive motor, and wherein said method further includes the step of:
   repeatedly performing steps (d) and (e) over certain ones of said progressive offset tracks to measure the radial alignment of said disk drive for each of the rotational phase positions of the disk drive motor.

10. The method of claim 7 wherein said diagnostic diskette further includes a pair of index timing tracks located adjacent the inner most and outer most track on said disk, respectively, and wherein said method further comprises the steps of:
   (h) generating an index pulse from said index transducer;
   (i) initiating a count in a counter in response to the generation of said index pulse;
   (j) counting a fixed number of pulses from one of said index timing tracks;
   (k) stopping said counter after the last pulse has been read from said index timing track; and
   (l) comparing the time value held by said counter with a reference time value to determine the alignment of said index transducer.

* * * * *